United States Patent
Suhara et al.

(10) Patent No.: US 7,411,319 B2
(45) Date of Patent: Aug. 12, 2008

(54) SAFETY RELAY SYSTEM

(75) Inventors: Masaaki Suhara, Osaka (JP); Tetsu Inoue, Osaka (JP)

(73) Assignee: Keyence Corporation, Osaka (JP)

( * ) Notice: Subject to any disclaimer, the term of this patent is extended or adjusted under 35 U.S.C. 154(b) by 394 days.

(21) Appl. No.: 10/881,066

(22) Filed: Jun. 30, 2004

(65) Prior Publication Data
US 2005/0063114 A1 Mar. 24, 2005

(30) Foreign Application Priority Data
Jun. 30, 2003 (JP) .................... P 2003-186908

(51) Int. Cl.
H02H 11/00 (2006.01)
G08B 29/00 (2006.01)
G08B 31/00 (2006.01)
G08B 26/00 (2006.01)
G08B 21/22 (2006.01)

(52) U.S. Cl. .................................................. 307/326
(58) Field of Classification Search ................. 307/326
See application file for complete search history.

(56) References Cited

U.S. PATENT DOCUMENTS

| 3,704,396 | A | * | 11/1972 | Macdonald | ........... | 361/175 |
|---|---|---|---|---|---|---|
| 4,309,696 | A | * | 1/1982 | Nagai et al. | ........... | 340/515 |
| 4,818,866 | A | * | 4/1989 | Weber | ........... | 250/221 |
| 5,015,840 | A | * | 5/1991 | Blau | ........... | 250/221 |
| 5,198,661 | A | * | 3/1993 | Anderson et al. | ........... | 250/221 |
| 5,218,196 | A | * | 6/1993 | Dogul et al. | ........... | 250/221 |
| 5,280,622 | A | * | 1/1994 | Tino | ........... | 700/255 |
| 5,281,809 | A | * | 1/1994 | Anderson et al. | ........... | 250/221 |
| 5,302,942 | A | * | 4/1994 | Blau | ........... | 340/556 |
| 5,404,008 | A | * | 4/1995 | Malinowski et al. | ........... | 250/222.1 |
| 5,559,664 | A | * | 9/1996 | Dogul et al. | ........... | 361/191 |
| 5,818,123 | A | * | 10/1998 | Iwasaki et al. | ........... | 307/42 |
| 5,828,302 | A | * | 10/1998 | Tsutsumi et al. | ........... | 340/540 |
| 5,880,954 | A | * | 3/1999 | Thomson et al. | ........... | 700/79 |
| 6,137,408 | A | | 10/2000 | Okada | ........... | 340/556 |
| 6,166,371 | A | * | 12/2000 | Milbrath et al. | ........... | 250/221 |
| 6,204,575 | B1 | | 3/2001 | Yamaguchi | ........... | 307/119 |
| 6,683,432 | B2 | * | 1/2004 | Griffis | ........... | 318/568.16 |
| 6,856,862 | B1 | * | 2/2005 | Feltner | ........... | 700/245 |
| 6,912,484 | B2 | * | 6/2005 | Bibelhausen et al. | ........... | 702/188 |
| 6,974,948 | B1 | * | 12/2005 | Brent | ........... | 250/221 |

(Continued)

FOREIGN PATENT DOCUMENTS

| EP | 0 962 787 A2 | 12/1999 |
|---|---|---|
| EP | 0 964 324 A1 | 12/1999 |
| JP | 11-162317 | 6/1999 |
| WO | WO 01/81820 A1 | 11/2001 |
| WO | WO 01/82668 A1 | 11/2001 |

*Primary Examiner*—Michael J Sherry
*Assistant Examiner*—Adi Amrany
(74) *Attorney, Agent, or Firm*—Kilyk & Bowersox, P.L.L.C.

(57) ABSTRACT

A safety relay system includes one or more additional input units each for sending safety input from a safety component, a master unit for receiving the safety input from the additional input unit and providing safety output to operate a safety relay based on the safety input, a safety information line for transferring safety information between the units, a non-safety information line for transferring non-safety information separate from the safety input, the non-safety information being information concerning an operation state of each safety component or each unit, and a non-safety information output section for outputting the non-safety information transferred on the non-safety information line.

19 Claims, 8 Drawing Sheets

U.S. PATENT DOCUMENTS

| | | | |
|---|---|---|---|
| 6,979,813 B2 * | 12/2005 | Avril | 250/221 |
| 2002/0038981 A1 * | 4/2002 | Brown et al. | 307/125 |
| 2003/0058602 A1 | 3/2003 | Veil | 361/166 |
| 2003/0058623 A1 | 3/2003 | Veil | 361/728 |

* cited by examiner

SAFETY RELAY SYSTEM

This application claims priority based on Japanese Patent Application No. JP 2003-186908, filed on Jun. 30, 2003, the contents of which is incorporated by reference in its entirety.

BACKGROUND OF THE INVENTION

1. Field of the Invention

The present invention relates to a high-reliability safety relay system suited for use, for example, to drive a target load only if a plurality of input conditions concerning safety check, etc., all hold.

2. Description of the Related Art

A safety measure apparatus is used from the necessity for a safety measure in various quarters. For example, a machine tool, a pressing machine, a robot, a packing machine, an elevator, and the like are used at a manufacturing location, and various safety measures become necessary to protect workers from the machines, the apparatus, etc. For example, when an anomaly occurs, power supply to the machine is cut off, thereby stopping the mechanical operation for securing safety for workers. To construct such a system, a safety relay apparatus is used.

The safety relay apparatus opens and closes electrical contacts to control energization. Some safety relay apparatus, for example, contain a plurality of relays each with a forcible guide and also include a self-holding function, duplexing of relay contacts, a back check function based on relay NC contacts, a heterostructure, and the like. The relay with a forcible guide is a relay of the type wherein when one normally open contact (NO) is welded, a different normally closed (NC) contact becomes open in a coil non-excitation state and when one normally closed contact is welded, a different normally open contact becomes open in a coil excitation state (for example, JP-A-11-162317). The self-holding function is a function intended so as not to restart the system if safety information is entered by operating an emergency stop switch, etc., for example, and then the state is restored (reset). Further, the duplexing of relay contacts is also called redundancy; as contacts are provided in parallel, if one contact is welded, it is made possible to provide function by another contact provided in parallel. Further, the back check function based on relay NC contacts is a function for detecting a failure of contact welding, etc., of a relay or a contactor and checking the contact state. The heterostructure (diversity structure) is a structure wherein as different types of members are used in combination, even if trouble of a bug, etc., occurs in a specific member, if the trouble is proper to the type, the same trouble does not occur at the same time and therefore it is made possible to provide function by another member.

In recent years, the number of countries and regions in which the safety measure standard is made a legal requirement has increased and particularly demand has grown for a safety relay apparatus or system of the specifications compliant with such a safety measure standard. As the safety standards, ISO, IEC, EN, JIS, and the like are defined in response to the standard targets and regions. Particularly, demands for machine safety are enhanced in response to "guidelines for comprehensive safety standard of machines" notified by the Ministry of Health, Labour and Welfare in June 2001, ISO12100, and the execution schedule of incorporating ISO12100 into JIS. For example, to receive certification of category 4, the highest safety level based on EN954-1 of a standard concerning machine safety of the European standards, a redundant structure, a heterostructure, always making self-inspection of data for maintenance of circuitry or parts, and the like are required.

FIG. 9 shows a configuration example of a system for stopping a machine with one safety component to secure safety. The safety component is an element for sending a command for cutting off power supply to any desired machine upon reception of specific operation to secure safety of workers. For example, it corresponds to output of an emergency stop button for the worker to stop the operation of a drive motor for a tooling change, teaching, or adjustment of a machine, output of a safety door switch for detecting a safety door being released to allow the worker to enter the work area of a machine, output of a light curtain for optically detecting the worker approaching a dangerous area, or the like. A safety component 1 is used with a safety output unit 2 for implementing a safety relay apparatus in combination to make up a safety circuit. A safety component switch 3 of normally closed break type is connected to the safety circuit shown in FIG. 9. When the safety circuit is closed, the safety output unit 2 determines that the state is normal, and closes a relay 4 for maintaining power supply to the connected machine. On the other hand, if the safety circuit is opened as the safety component switch 3 is operated manually by the worker or the user or is operated according to output of a sensor, etc., the safety output unit 2 determines that the state is unsafe, and releases the relay 4 for cutting off power supply to the connected machine to stop the operation thereof.

To provide the system with redundancy, a dual-redundant safety circuit made up of two safety circuits is formed as shown in FIG. 9 and as the safety component switch 3 is operated, both safety circuits are opened. Accordingly, if one of the safety circuits becomes defective or fails due to contact welding, etc., the other safety circuit functions, so that the machine can be stopped. Further, self-inspection is made, whereby an anomaly of contact welding, etc., can be detected and accumulating of failures can be prevented. The system also adopts a heterostructure for preventing the same defectiveness from occurring at the same time.

To make the apparatus or system compliant with the various standards including EN954-1, etc., described above, it is necessary to duplex the circuitry for handling safety information and provide a self-check function and generally the circuit design becomes complicated. On the other hand, even if the system is configured so as to be able to check the safety state by duplexing the circuitry, etc., if the cause, location, etc., of an accident when the system becomes down cannot be detected or determined without any measure. Since the cause of the accident needs to be removed to recover the system, it is desirable that the cause and the location of the accident should be able to be detected to recover the system early. Thus, a circuit for outputting or displaying various pieces of information for facilitating safety check and danger detection may be added to an input unit to which a safety component is connected or a safety output unit to which a safety relay is connected. For example, detailed information concerning safety information, such as the state of the safety component and error information, can be added for easily determining trouble, etc.

However, if such detailed information concerning safety information is used as safety input, the circuit for handling the information also requires facilities of duplexing, self-check, etc., for safety, and the circuitry becomes furthermore complicated; this is a problem. If design change occurs in the system, construction of the safety system responsive to the design change needs to be again designed, and the job is extremely intricate. Construction of the system compliant with the condition to receive standard certification is urgently required particularly under the present circumstances in which extreme importance tends to be placed on reception of certification of various safety standards combined with making the safety standard a legal requirement and the demands for the safety measures in recent years.

SUMMARY OF THE INVENTION

It is an object of the invention to provide a safety relay system for making it possible to add non-safety information relevant to safety information without affecting the safety information for easily maintaining, recovering, redesigning, etc., the safety system.

To the end, according to a first aspect of the invention, there is provided a safety relay system for acquiring safety input from one or more safety components, checking a safety state, if safety is checked, outputting safety output for opening/closing a safety relay to enable an external connected machine connected to the safety relay to operate and on the other hand, if it is determined that the state is unsafe, opening/closing the safety relay to directly or indirectly stop the operation of at least a hazardous part in the external connected machine, the safety relay system including one or more additional input units for sending safety input from the safety component; a master unit for receiving the safety input from the additional input unit and providing safety output to operate the safety relay based on the safety input; a safety information line for transferring safety information between the units; a non-safety information line for transferring non-safety information separate from the safety input, the non-safety information being information concerning the operation state of each safety component or each unit; and a non-safety information output section for outputting the non-safety information transferred on the non-safety information line.

The safety information transmitted on the safety information line is not affected by the non-safety information transmitted on the non-safety information line and safety output of the master unit operates based on the safety information transmitted on the safety information line and does not depend on the non-safety information on the non-safety information line. Accordingly, the state of each safety component, error information, and the like can be transmitted to the master unit according to the non-safety information, and it is made possible to rapidly recover the system from trouble based on the information. As the non-safety information is separated from the safety information and is sent on the separate line, the circuit of the non-safety information can be simplified. The non-safety information has no effect on the safety information, so that the advanced safety standard can be met without affecting the reliability of the circuit concerning the safety information.

The safety relay system according to a second aspect of the invention is characterized by the fact that in the safety relay system of the first aspect, each additional input unit includes a non-safety control section for communicating the non-safety information, and the non-safety information is transferred to each adjacent unit in order, whereby each additional input unit communicates with the master unit.

The safety relay system according to a third aspect of the invention is characterized by the fact that in the safety relay system of the first aspect, each additional input unit includes a non-safety control section for communicating the non-safety information, and each additional input unit communicates directly with the master unit.

The safety relay system according to a fourth aspect of the invention is characterized by the fact that the safety relay system in any of the first to third aspects further includes an end unit being connected to one end of the one or more additional input units for causing the master unit to detect the number of the connected additional input units.

The safety relay system according to a fifth aspect of the invention is characterized by the fact that the safety relay system in any of the first to fourth aspects further includes the one or more additional output units for receiving safety output from the master unit and operating the safety relay based on the received safety output.

The safety relay system according to a sixth aspect of the invention is characterized by the fact that in the safety relay system in any of the first to fifth aspects, the one or more-additional input units and the one or more additional output units are connected to the safety information line for enabling the additional input units to communicate safety input to each other and the additional output units to communicate safety output to each other.

The safety relay system according to a seventh aspect of the invention is characterized by the fact that in the safety relay system in the fifth or sixth aspect, the safety information line connects the one or more additional input units and the one or more additional output units as the same line for enabling the safety input and the safety output to be communicated between each unit and the master unit.

The safety relay system according to an eighth aspect of the invention is characterized by the fact that in the safety relay system in the fifth or sixth aspect, the safety information line is connected via a connector provided on each unit and either of the additional input unit and the additional output unit can be connected to the same connector.

The safety relay system according to a ninth aspect of the invention is characterized by the fact that in the safety relay system in the eighth aspect, the safety information line includes a safety input line and a safety output line and the safety input line is connected to the additional input unit for sending safety input and the safety output line is connected to the additional output unit for sending safety output.

The safety relay system according to a tenth aspect of the invention is characterized by the fact that in the safety relay system in any of the first to ninth aspects, the safety information line is a serial line.

The safety relay system according to an eleventh aspect of the invention is characterized by the fact that in the safety relay system in any of the first to tenth aspects, each additional input unit includes a safety control section for performing AND operation for safety input transmitted via the safety information line from the additional input unit connected to the preceding stage of that additional input unit and safety input from the safety component connected to that additional input unit and outputting the AND operation result as safety input.

The safety relay system according to a twelfth aspect of the invention is characterized by the fact that in the safety relay system in any of the first to ninth aspects, the safety information line is parallel lines and when safety input is transmitted straightly from the master unit through the additional input units to the end unit and then is transmitted from the end unit to the master unit, each time the safety input passes through each of the additional input units, a shift is made on the parallel line to transmit the safety input, and the number of the connected additional input units can be detected based on which parallel line the safety input received at the master unit is detected from.

The safety relay system according to a thirteenth aspect of the invention is characterized by the fact that the safety relay system in any of the first to twelfth aspects further includes a power unit being connected to the master unit for supplying power to the safety relay system.

The safety relay system according to a fourteenth aspect of the invention is characterized by the fact that in the safety relay system in any of the fourth to thirteenth aspects, a rating declaration part is provided on a side of the end unit.

The safety relay system according to a fifteenth aspect of the invention is characterized by the fact that in the safety relay system in any of the fifth to fourteenth aspects, at least either the additional input unit or the additional output unit includes a non-safety information display section for externally displaying non-safety information and a non-safety information interface for sending non-safety information to an external machine.

The safety relay system according to a sixteenth aspect of the invention is characterized by the fact that in the safety relay system in any of the first to fifteenth aspects, the non-safety information includes at least any of ON/OFF information of the safety component connected to the master unit or each additional input unit, an error state and error information of each unit, output information of the master unit or the additional output unit, operation mode information of each additional input unit, or setup information of each unit.

DETAILED DESCRIPTION OF THE INVENTION

Figure 1:
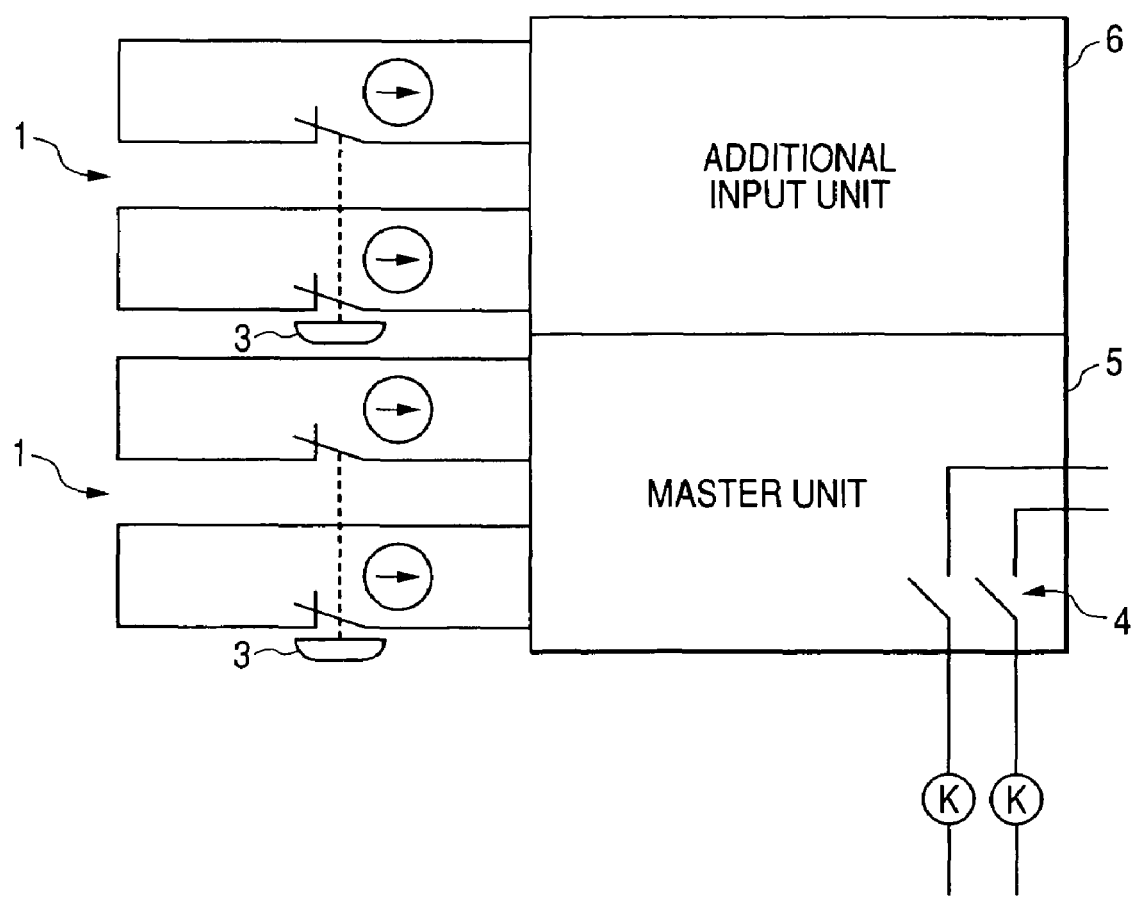
FIG. 1 is a schematic diagram to show a configuration example of a safety relay system.

Referring now to the accompanying drawings, there are shown preferred embodiments of the invention. However, the embodiment shown below is for illustrative purposes only for a safety relay system to embody the technical philosophy of the invention and the invention does not limit the safety relay system to the following.

The specification does not limit members as claimed in claims to the members of the embodiment. Particularly, the dimensions, material, shapes, relative placement, etc., of the components described in the embodiment do not define the scope of the invention unless otherwise specified, and are only simple examples for the purpose of description. The sizes of the members, the positional relationship, etc., shown on the accompanying drawings may be exaggerated for purposes of illustration. In the description to follow, the same names or the same reference numerals denote the same or identical members and detailed description is omitted as required. Further, each of the elements making up the invention may be a mode in which a plurality of elements are implemented as a single member for functioning as the plurality of elements or a mode in which a plurality of members share the function of a single member.

In the specification, the expression of "input side," "output side," etc., is used for the purpose of description, and does not necessarily mean serving only the input, output function. For example, an input side terminal can also handle output or an output side terminal can also handle input. Particularly, if a communication function is not provided between units and a recognition signal is transferred only with a wiring pattern, each connection terminal serves the function of input or output in response to the connection mode.

FIG. 1 shows a configuration example of a safety relay system according to one embodiment of the invention. It shows the safety-relevant portions of a control system. In the example, as two safety components 1, safety component switches 3 of emergency stop switches are connected to the safety relay system. Each of the emergency stop switches includes a direct opening operation function (forcible opening function) and has contacts duplexed for forming a safety circuit in each. The safety relay system determines whether or not the state is safe based on the input state from each safety component to check safety. If safety cannot be checked, the safety relay system determines that the state is unsafe, and stops the operation of hazardous parts in the connected machines. The operation not only can be stopped by directly controlling and opening the relays for cutting off power supply, but also can be stopped indirectly through a contactor, etc. Alternatively, a stop instruction may be sent to the connected machine for stopping the operation while actively controlling the hazardous part in the machine based on the instruction in addition to cutting off the power supply. In the example given below, cutting off the power supply by the relays will be discussed, but the invention is not limited to the configuration and means for stopping the connected machine by another method can also be adopted. The expression "unsafe state" throughout the specification is used to mean a state in which the safety component operates normally and a human being attempting to enter a dangerous area is detected or the like; on the other hand, "anomaly" is used to means a state in which the safety component, safety relay apparatus, etc., fails or the like. The safety relay system includes a master unit 5 including relays 4 as the safety relay apparatus and an additional input unit 6 with no relay.

[Master Unit]

The master unit 5 includes an input section to connect the safety component 1. Further, the master unit 5 contains the relays 4; when a state in which safety cannot be checked, such as anomaly occurrence, is detected, the relay 4 is switched according to a stop instruction to the connected machine. As the relay 4, an electromagnetic relay, a solid-state relay, an electromagnetic relay with a forcible guide mechanism, and the like can be used as required. The relay contacts are duplexed and if one relay contact is welded, the other relay contact is opened, so that the connected machine can be stopped reliably. The relay 4 controls energization of the connected machine such as a motor via a contactor or can also be connected directly to the connected machine without a contactor. The contactor can also be duplexed so that if one contactor contact is welded, the other contactor contact is opened for stopping the connected machine. In this case, the other contactor contact can be opened even with one contactor contact welded, so that if a start switch is turned on after the connected machine stops, the machine cannot be restarted and a back check function can be provided.

The master unit 5 may have no input section to connect the safety component and the safety component may be connected to the additional input unit 6. The master unit 5 may be configured so as to control an external relay without containing the relays 4.

[Additional Input Unit 6]

The additional input unit 6 also includes an input section to connect the safety component. Unlike the master unit 5, the additional input unit 6 does not contain any relay, so that the circuitry can be simply configured for making the unit inexpensive. The relay includes mechanical operation parts, needs a control circuit for drive, etc., and also requires contacts that can resist energization of a large current and that have durability to function properly if opening/closing operation of the contacts is repeated; generally the relay becomes complicated and expensive. Thus, the cost also increases in response to the number of inputs in a configuration in which the relay 4 is provided for each unit to which the safety component 1 is connected. In contrast, in the configuration in FIG. 1 according to the embodiment of the invention, as it is made possible to add the additional input unit 6 having no relay, each unit added in response to the number of inputs can be simplified for reducing the cost. In the additional input unit 6 including no relay, a large current for energizing the relay does not flow and thus wiring connection for a large current is not required and a more inexpensive and easy-to-connect signal line needs only to be connected. Moreover, connector type can be adopted and thus joining can also be performed simply and easily. Further, wiring also lessens, thus contributing to space saving.

The safety component switch 3 of the safety component 1 connected to each unit is a normally closed (NC) contact. Each safety circuit is closed and is energized in the normal time, and the unit monitors the state as safety information and closes the relay 4 for energizing the connected machine such as the motor. On the other hand, if the emergency stop switch is pressed during an emergency, the normally closed contacts of the two corresponding safety component switches 3 are broken and the safety switch is opened, so that the unit detects that safety information is lost, and opens the relay 4 to cut off energizing the connected machine. In this state, the connected machine cannot be operated.

In the safety relay system, if any of the safety component switches 3 of the safety components 1 connected to the master unit 5 or the additional input unit 6 is operated, the corresponding safety circuit is opened, so that a state in which safety cannot be checked can be detected. Moreover, the safety circuits are independent of each other and thus if defectiveness or a failure occurs in any safety component switch 3, the state can be detected. In the self-inspection of the safety component switch 3 by the master unit 5, for example, a test signal is sent every predetermined period for checking the switch for opening and closing. According to the configuration, duplexing of the relay contacts, the back check function of the contactor contacts, and the self-inspection of the safety component switch are realized and it is made possible to implement a safety relay system that can be compliant with the safety standards including category 4 based on EN954-1. Category 4 requires that "the safety function should not be lost due to a single failure and a single failure should be detected at the next request time of the safety system or before the next request time. If it is impossible, the safety function should not be lost due to accumulating of failures" as design of the safety system for a single failure.

The safety components are not limited to the emergency stop switches, and members for checking specific operation to secure safety of workers, such as various sensors. For example, a limit switch for detecting opening and closing of a safety door provided on a fence for allowing the worker to enter and exit the work area of the machine surrounded by the fence for partitioning the work area of the machine, a light curtain for optically detecting the worker approaching the machine, an area sensor, and the like can be used. If safety is checked by the safety components, safety input is output to the master unit 5 and if safety is checked by all safety components, namely, all safety inputs are set to ON, the master unit 5 sets safety output to ON for permitting the operation of the machine.

[Addition of Additional Input Unit 6]

Figure 2:
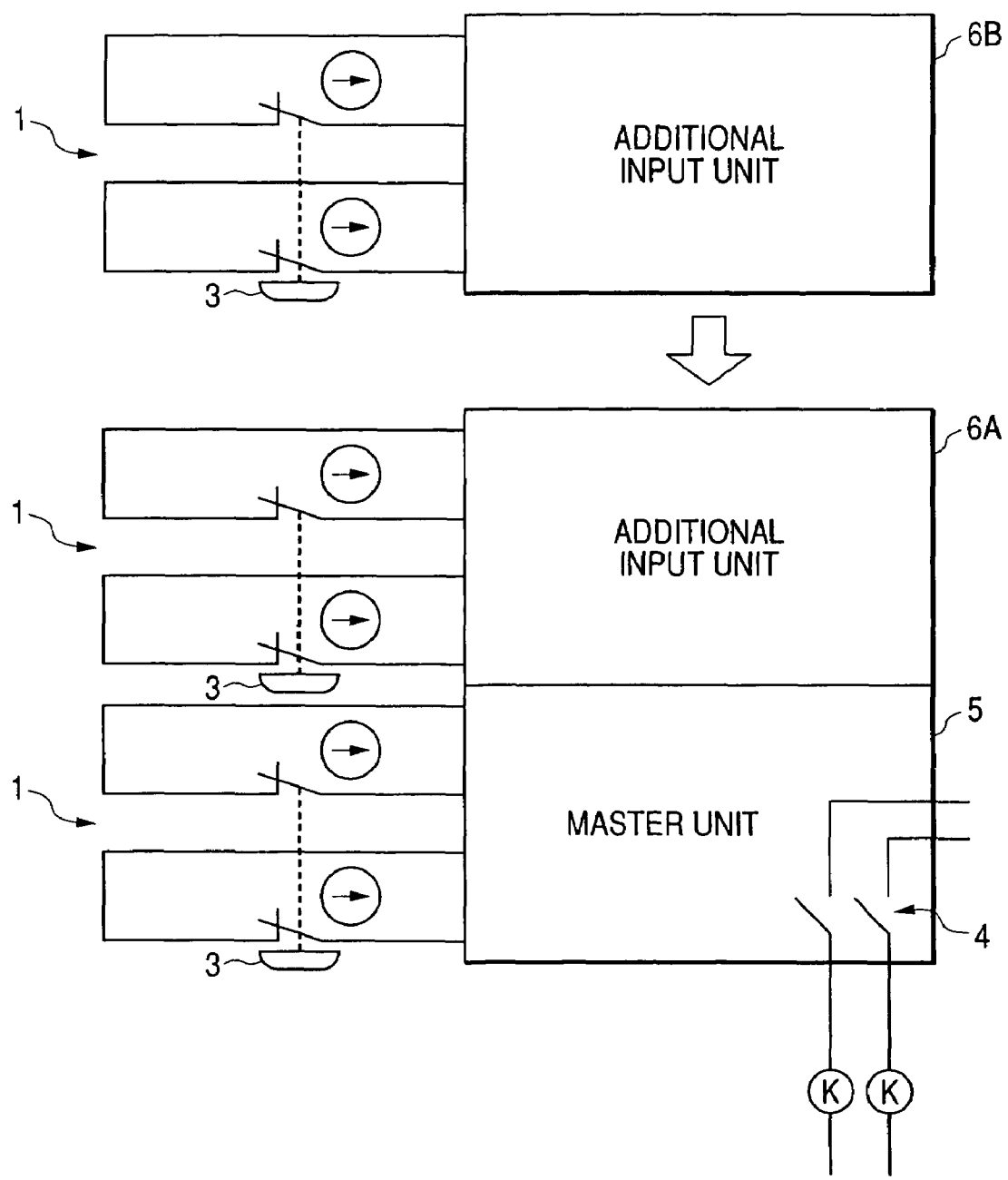
FIG. 2 is a schematic diagram to show a state in which a safety component is added to the safety relay system in FIG. 1.

FIG. 1 shows an example of connecting the two safety components. To further add a safety component for inputting three safety components, an additional input unit 6B is added to an additional input unit 6A as shown in FIG. 2. As the additional input unit 6B, a similar unit to the additional input unit 6A described above can be used. A safety component switch 3 of a safety component 1 connected to the additional input unit 6B is operated in a similar manner to that described above, and the relay 4 of the master unit 5 is operated according to the operation of the emergency stop switch, etc. Accordingly, another additional input unit 6 can be added for easily installing an additional safety component without again designing the system from the beginning or changing an assembly of the circuits. Outputs of the additional input units 6 can be collected in the master unit 5, so that the wiring between the units can be simplified, also contributing to wiring reduction in this point.

[Connector]

Figure 3:
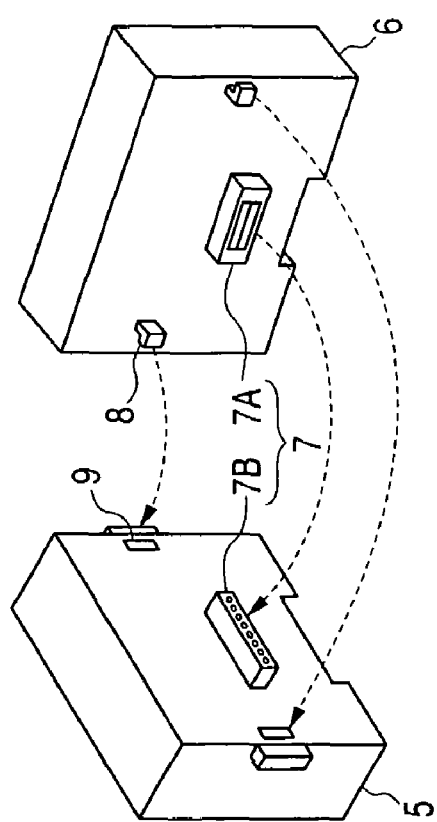
FIG. 3 is a schematic perspective view to show how a master unit is connected to an additional input unit.

To connect the units, a connector is used. The connector electrically connects a plurality of connection terminals. The additional input unit 6 is provided with an input terminal group and an output terminal group; the input terminal group is connected to another additional input unit 6 or an input end unit 12 and the output terminal group is connected to another additional input unit 6 or the master unit 5. FIG. 3 shows how the additional input unit 6 is connected to the master unit 5 by way of example. In FIG. 3, connectors 7 are inserted into each other and the units are joined as secured by hooks. Since the additional input unit 6 does not include any relay as described above, wiring for a large current flowing through the relay becomes unnecessary and simple connector-type connection is adequate. A connection connector 7 is provided roughly at the center of a side of each unit; the connectors are placed at the corresponding positions so that one becomes male connector 7A and the other becomes female connector 7B on the opposed joint faces. On the joint faces of the units, a pair of hooks 8 on both sides each in the vicinity of an end part of one face, and a pair of securing grooves 9 for securing the hooks at the positions on the opposed face corresponding to the hooks, are provided. The master unit 5 is provided with the connector 7 and the hooks 8 or the securing grooves 9 only on one face to which the additional input unit 6 is joined; the additional input unit 6 is provided with the connector 7 and the hooks 8, etc., on both faces so as to allow another unit to be connected to either face. Although FIG. 3 shows a connection example of the master unit 5 and the additional input unit 6, the additional input units 6 can be connected or the additional input unit 6 and the input end unit 12 can be connected in a similar manner.

Figure 4:
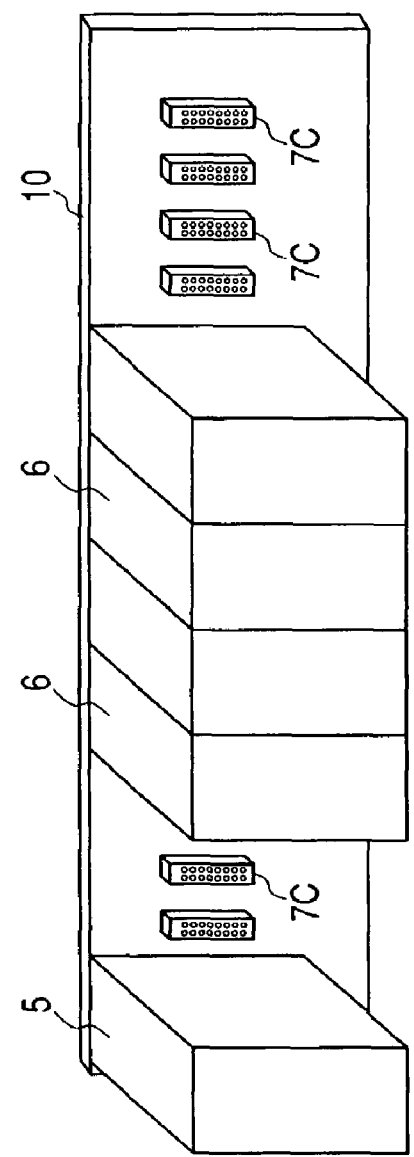
FIG. 4 is a schematic perspective view to show another example of connection of additional input units to a master unit.

The connector is a connector of the type wherein an input terminal group and an output terminal group are provided separately and are joined directly to the output terminal group and the input terminal group of another connector between the units; the connector can also be a connector having an input terminal group and an output terminal group in one piece. For example, in FIG. 4, units are mounted on a connection board 10. In the example in FIG. 4, each unit is provided on one face with a male connector having an input terminal group and an output terminal group in one piece, and the connection board 10 is provided with a plurality of female connectors 7C that can be engaged with the male connectors. The female connectors 7C are provided on the connection board 10 with a given spacing, and the spacing of the female connectors 7C is set so that the units are arranged roughly in a line with the units mounted on the connection board 10.

The male and female relationship of the male and female connectors between the units and the connection board may be made opposite, and as the shape of each connector, the type wherein a plurality of pins are placed, the type wherein contacts are placed on a face like a bellows, or the like can be used as required. The position of each connector is not limited to the rough center and can be set to any desired position such as an eccentric position or an end part. The connector itself may be provided with a securing member such as a hook to serve as both electric connection and mechanical joining. Alternatively, the units can also be connected via a connector, a cord, etc., of a different member in addition to the manner in which the connectors provided on the units are joined directly to each other.

[Addition of Output Side]

The configuration for adding the input side of the safety relay system has been described. Next, the configuration for adding an output side of the safety relay system will be discussed. In the safety relay system, the user may want to add an output side. To increase the number of machines to be stopped when an unsafe state or an anomaly is detected, a relay, etc., to cut off power supply to the machine needs to be added to the output side of the master unit. Then, an additional output unit 16 is joined to the master unit. The safety component is connected to the additional input unit 6 and safety input is obtained from the safety component, as described above. On the other hand, a safety relay output section 58 is connected to the additional output unit 16 and a relay is opened or closed based on a stop signal as safety output.

[Status Safety Check Information]

Further, each additional output unit 16 continues to detect information to check safety and sends the safety check information to the master unit and the master unit always monitors the safety check information provided by each additional output unit 16, so that the safety relay can be operated continuously to the safety side. That is, control is performed so as to operate the connected machine in a state in which safety can be checked, and stop the operation when safety cannot be checked. Preferably, the safety check information is a dynamic signal. The additional output unit 16 sends status safety check information to the master unit as the safety check information. The status safety check information is a signal to check that the operation of the additional output unit 16 is normal or an anomaly or a failure does not occur by a self-diagnosis circuit contained in the additional out put unit 16, and can also contain error information, etc., of the additional output unit 16. The check is performed regardless of whether the stop signal is ON or OFF. The additional output unit 16 includes a safety check information output section (not shown) for outputting various pieces of safety check information containing the status safety check information.

[Safety Information Line 42]

Figure 5:
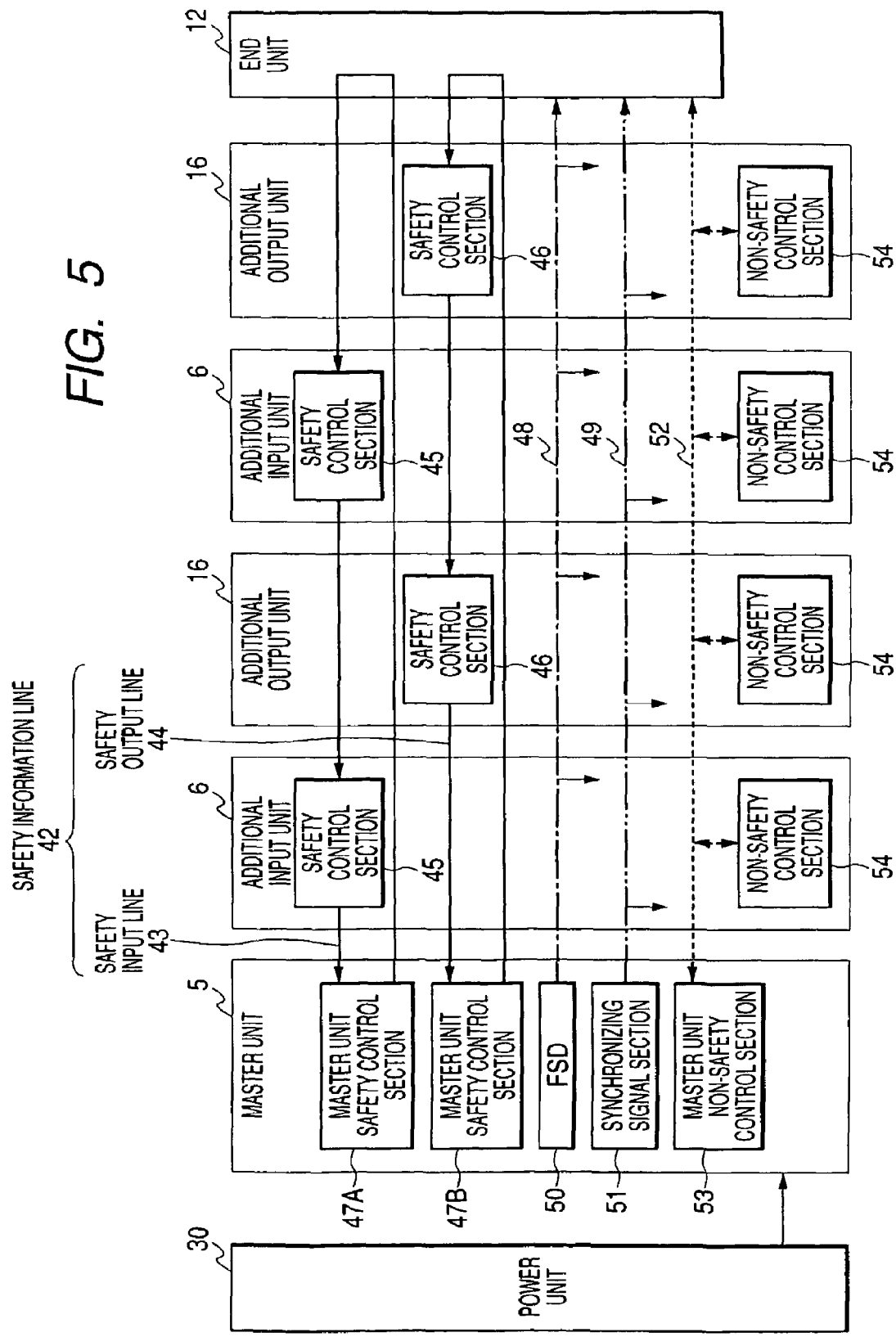
FIG. 5 is a block diagram to show the connection state of a safety relay system according to one embodiment of the invention.

FIG. 5 is a block diagram to show the connection state of a safety relay system according to one embodiment of the invention. The safety relay system shown in the figure includes a master unit 5 with one side to which a power unit 30 is connected, a plurality of additional input units 6 and a plurality of additional output units 16 connected to an opposite side of the master unit 5, and an end unit 12 connected to the end face. In the example in the figure, the power unit 30 is connected to the master unit 5, the two additional input units 6 and the two additional output units 16 are connected alternately, and the end unit 12 is connected to the end face. The units are connected in series so that they are contiguous to each other via connectors. A safety information line 42 for transferring safety input is made up of a safety input line 43 and a safety output line 44. A safety control section 45 of each additional input unit 6 is connected to the safety input line 43 and a safety control section 46 of each additional output unit 16 is connected to the safety output line 44.

[Safety Input Line 43]

The safety input line 43 is a line for transmitting safety input of an input safety circuit signal and is duplexed so as to provide two channels of signals to enhance safety. The safety input signal is an input safety control section signal. The safety input line 43 includes a through line connected through each unit from the master unit 5 to the end unit 12 and a return line returned from the end unit 12. In the figure, the safety input line 43 is connected to a master unit safety control section 47A of the master unit 5 in series, and the return line of the safety input line 43 connects the safety control sections 46 of the additional input units 6 and on the other hand, is through the additional output units 16. Accordingly, the additional input unit 6 recognizes a signal from another additional input unit 6 or the end unit 12 connected by the safety input line 43. That is, the additional input unit 6 generates new safety input based on safety input transferred from the preceding stage or the signal from the end unit 12 and safety input indicating the safety state of the safety component connected to the additional input unit 6, and transfers the safety input to the following stage. For example, when safety is checked in the safety components connected to all additional input units 6 as the result of AND operation of the safety input at the preceding stage and the safety input of the additional input unit 6 together is used as new safety input, safety input is obtained in the master unit 5 and safety output can be set to ON based on the safety input. As the safety information is checked in order for each unit, the number of buses can be decreased and the safety control sections 45 and 46 can be simplified. The number of units that can be connected is not limited by the number of buses, and it is made possible to add a large number of units. It is understood that information as to whether a person approaching a dangerous area is detected, or that a safety component or unit is abnormal when that safety component or unit is determined to be in an unsafe state, is information which becomes necessary after the connected machine is stopped and does not directly relate to determination as to whether operation of the connected machine is to be permitted or stopped, and therefore need not be handled on the safety information line. The information truly required as the safety information is information indicating that safety of all units or safety components can be checked, or conversely, information indicating that safety cannot be checked in any of the safety components or units can be used to determine whether operation of the connected machine is to be permitted or stopped.

However, the safety input line can also be made parallel lines so as to make shift connection between the units, although embodiments having such connections are not shown. For example, the units of the master unit to the end unit are connected directly and on the other hand, the return line is shifted one at a time whenever one additional input unit is passed through, so that a signal is returned to the master unit with as many shifts as the number of the connected additional input units. Thus, the master unit can check the terminal number at which safety input is detected, thereby detecting the number of the connected additional input units. Output of the safety component connected to each additional input unit is transferred to the master unit while it is shifted in a similar manner, so that safety cannot be checked in which safety component can also be detected.

[Safety Output Line 44]

The safety output line 44 is a line for transmitting safety output of an output safety circuit signal and is duplexed so as to provide two channels of signals like the safety input line 43. The safety output signal is an output safety control section signal. The safety output line 44 also includes a through line connected from the master unit 5 to the end unit 12 and a return line returned from the end unit 12, which are connected as a serial line. In the figure, the safety output line 44 is connected to a master unit safety control section 47B of the master unit 5 in series, and the return line of the safety output line 44 connects the safety control sections 46 of the additional output units 16 and on the other hand, connects through the additional input units 6. Accordingly, the additional output unit 16 recognizes safety check information from another additional output unit 16 or the end unit 12 connected by the safety output line 44. That is, the additional output unit 16 generates new safety output based on safety output transferred from the preceding stage or the signal from the end unit 12 and safety check information of the additional output unit 16, and outputs the safety output to the safety control section 46 of the additional output unit 16 at the following stage. Accordingly, the additional output unit 16 checks that the additional output unit 16 at the preceding stage operates normally, and informs the additional output unit 16 at the following stage or the master unit 5 that the additional output unit 16 operates normally.

The safety information line 42, namely, the safety input line and the safety output line, are indicated by solid line arrows in FIG. 5. Further, the circuit shown in FIG. 5 includes an FSD output line 48 indicated by the alternate long and short dashed line and a synchronizing signal line 49 indicated by the chain double-dashed line in addition to the safety information line 42 as the lines concerning safety signals. An FSD (Final Switch Device) 50 is placed between output from a safety sensor such as a light curtain (OSSD (Output Signal Switching Device)) and MPCE (Machine Primary Control Equipment) for directly stopping an external connected machine. The master unit 5 outputs a stop signal from each additional output unit 16 to the MPCE via the FSD output line 48 in response to the output state of the OSSD based on the safety input collected through the additional input units 6, etc. The additional output unit 16 controls the FSD output based on the stop signal. The additional input units 6 can also be monitored through the FSD output line 48. The FSD output line 48 is also provided as two channels for safety.

A synchronizing signal section 51 sends a synchronizing signal for synchronizing signals transferred in series from the master unit 5 to each unit via the synchronizing signal line 49. The timing at which the machine is operated is determined by the synchronizing signal. Unlike the safety information line 42, the FSD output line 48 and the synchronizing signal line 49 do not include a return line and send a stop signal and a synchronizing signal respectively from the master unit 5 to the end unit 12.

According to the described configuration, the connectors connected between the units can be made common and the number of pins can be decreased. In the example in FIG. 5, the additional input units 6 and the additional output units 16 are connected alternately between the master unit 5 and the end unit 12, but the invention is not limited to the example; the additional input units 6 and the additional output units 16 would be able to be connected at any desired positions between the master unit 5 and the end unit 12. For example, in a configuration in which the master unit is provided with an input connector and an output connector and an additional input unit is connected to the input connector and an additional output unit is connected to the output connector with the end unit connected to the end faces of the units, the connection state and placement (layout) are restricted. Since the number of units varies depending on the number of safety components and external connected machines, it is possible that the units cannot be advantageously placed depending on the placement space. According to the described embodiment of the invention, the additional input units 6 and the additional output units 16 can be mixed on the same line, so that the restriction on the placement is decreased and a flexible layout is made possible. Further, the flexibility of the layout makes it possible to use the space efficiently and can also contribute to miniaturization of the system.

[Non-Safety Information Line 52]

On the other hand, the circuit shown in FIG. 5 includes a non-safety information line 52 for sending non-safety information concerning safety information in addition to the safety information line 42. The non-safety information line 52 is indicated by the chain line in FIG. 5. It is an information signal line of the safety relay system; for example, an RS485 communication line, etc., can be used.

[Non-Safety Information]

The non-safety information includes, for example, ON/OFF information of each safety component connected to the master unit 5 and the additional input units 6, the error state and error information of each unit, output information of the master unit 5 and the additional output units 16, information concerning the actual output state concerning setting of OFF delay, etc., of the additional output unit 16, information concerning the actual input state in a state in which the safety component is invalidated in manual mode, maintenance mode, or mute mode of each additional input unit 6, setup information of each unit such as DIP switch information, ID information concerning the unit ID number assigned to each unit, status information, and the like. The status information includes ON/OFF of a stop signal, unit error information, etc. The term "non-safety information" throughout the specification is used to mean information which does not fall under safety information requiring special specifications under the standard, although it is information concerning safety information. Therefore, the non-safety information can include information concerning safety information and safety information itself, although the name involves non-safety. However, the non-safety information cannot be included in the safety information.

To assign the ID number to each unit, any known method or a method developed in the future can be used. For example, the following method can be used: A signal line to assign the ID number is added, the ID number is assigned to a unit in the connection order from the signal line, the ID number is transferred to the following unit, the increased ID number is assigned, and the ID number is further transferred to the following unit to increase the ID number each time one unit is passed through.

[Information Display of Area Sensor During Mute Mode]

Output information of an area sensor during the mute mode can also be displayed as the non-safety information. Some area sensors of a light curtain, etc., include a mute function. For example, when a robot arm turns, if it touches a light curtain, the mute function is set to ON at the timing at which the arm turns for temporarily making ineffective output of the safety component of the light curtain. When the mute function is effective, the function of the light curtain becomes ineffective and if a light shield state is entered, safety output is not set to OFF. However, although the mute mode can be displayed with the mute function set to ON, whether or not light is actually shielded on the light curtain cannot be checked. Then, non-safety information for outputting the light incidence or light shield state of the light curtain even during the mute mode is provided for the light curtain side or the relay unit for controlling the light curtain, whereby display and control can be performed based on the non-safety information. For example, it is made possible to display the light shield state of the light curtain on a monitor and send information to a PLC, etc., for controlling the apparatus, etc. Likewise, error information of each unit, etc., is output to an external system, whereby maintenance can be improved. Specifically, the mute mode and the light incidence/shield state are always monitored in the light curtain or the relay unit for controlling the light curtain. An interface is provided that can output information to a controller for controlling the machine operation of the PLC, etc., in addition to output of safety information for controlling ON/OFF of the external connected machines actually.

The non-safety information line 52 is provided separately from the safety information line 42 for handling the safety information to separate the safety information and the non-safety information. The safety information may be fed back into the non-safety information, but the non-safety information is not fed back into the safety information. Accordingly, the safety information is completely separated and is handled independently without effects from the non-safety information. In other words, if some anomaly occurs in a circuit for handling the non-safety information, a circuit for handling the safety information is not affected and the safety of the system is maintained. Consequently, only the circuit for handling the safety information is duplexed and the self-check function is added thereto as required, whereby the safety standard defined in IEC 61508-27.4.2.3, etc., is incorporated. On the other hand, the non-safety circuit for handling the non-safety information need not be provided with the specifications and thus can be configured comparatively simply. Further, a configuration in which the safety information and the non-safety information are handled at the same time requires strict specifications so long as the safety information is handled. However, as the safety information and the non-safety information are separated, only the circuit for handling the safety information needs to satisfy the required specifications, so that the system configuration can be simplified. This means that design change of the system can also be made flexibly, and the necessity for again designing the safety circuitry can be eliminated. In addition, as the non-safety information is added, when trouble occurs, the system can be easily recovered from the trouble, etc.; the ease-of-use of the system and the operation thereof can be improved. For example, where safety cannot be checked and the trouble occurrence part can be determined, the description of an anomaly can be displayed, and a recovery procedure can be guided.

In the relay unit used with a safety relay system in a related art, only ON/OFF information of apparatus is output as safety information because of the limitations of the specifications to comply with the safety standard. In other words, whether or not safety can be checked as a whole is only determined and the input state of an individual safety component cannot be checked. If safety can be secured, the location where safety cannot be checked cannot be determined and the cause cannot be detected. The cause cannot automatically be determined and the system recovery work is extremely difficult to conduct. If the input state of each safety component cannot be grasped when trouble occurs, the cause cannot be determined and the system cannot be recovered from the trouble. Considering the maintenance of the system, it is desirable that the state of each safety component should be checked. As the information is monitored, maintenance can be conducted efficiently and the time can be shortened. Then, the safety information and the non-safety information are separated, whereby it is made possible to use the non-safety information without using a complicated circuit. Generally, a system containing a machine, a robot, etc., includes a plurality of safety components such as an emergency stop button, a safety door, and a light curtain. As the input state of each safety component is checked as non-safety information, when a state in which safety of the system cannot be checked is entered, information is output for determining which safety component is the cause of making it impossible to check safety of the system. For example, the state of each unit such as ON/OFF information of the safety component connected to each additional input unit 6, etc., and unit error information is sent through a non-safety control section 54 to the master unit 5. The master unit 5 collects non-safety information in a master unit non-safety control section 53 and outputs the collected non-safety information to an external system from a non-safety information interface 55. This signal is input to an external PLC, etc., for display, so that it is useful for recovering the system from trouble when trouble occurs. The non-safety information does not directly relate to determination of safety or non-safety, namely, safety securing and is useful information concerning system recovery; the most of the information can be made for recovering the system more rapidly.

[Common Line]

Figure 6:
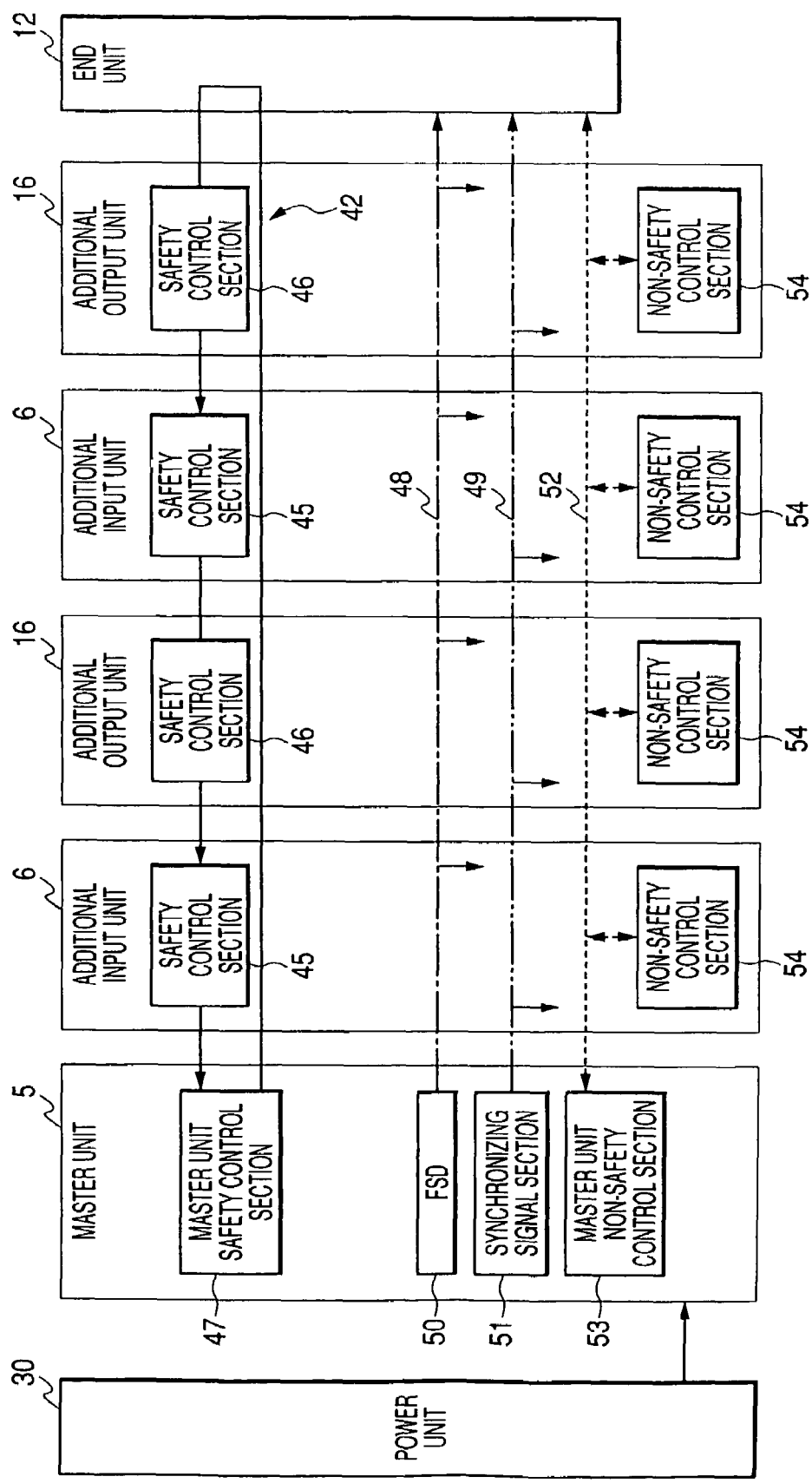
FIG. 6 is a block diagram to show the connection state of a safety relay system according to another embodiment of the invention.

The safety information line 42 can also be made a common line as shown in FIG. 6 in addition to the mode in which it is separated into the safety input line 43 and the safety output line 44 as in FIG. 5. Accordingly, an input safety control section signal and an output monitor circuit signal can be handled on the same bus. The safety information line 42 with safety input and safety output as a common line includes a straight through line from the master unit 5 to the end unit 12 and a return line returned from the end line 12. In the example in FIG. 6, the safety information line 42 is the through line from a master unit safety control section 47 of the master unit 5 to the end unit 12 and is reversed at the end unit 12, and the safety control sections 46 of the additional output units 16 and the safety control sections 45 of the additional input units 6 are connected on the return line. The safety control sections 45 and 46 and the master unit safety control section 47 of the master unit 5 transfer the safety information.

Each additional input unit 6 and each additional output unit 16 recognize a signal from the unit connected at the preceding stage on the return line or the end unit 12. The additional input unit 6 adopts safety input from the safety component connected to the additional input unit 6 and safety input transferred from the preceding stage as safety input in the safety control section 45 and sends the safety input to the additional input unit 6 at the following stage in order for transferring the safety input to the master unit 5. The additional output unit 16 generates safety check information in the safety control section 46 based on safety check information to check the normal state of the additional output unit 16 and safety check information of the additional output unit 16 connected at the preceding stage on the return line, and transfers the generated safety check information to the additional output unit 16 at the following stage. The safety control section 46 of the additional output unit 16 extracts safety check information transferred from the additional output unit 16 at the preceding stage or the end unit 12 from the signal transferred on the return line, and transfers the extracted safety check information. In other words, the safety input concerning the additional input unit 6 is allowed to pass through. On the other hand, the safety control section 45 of the additional input unit 6 extracts the safety input signal transferred from the additional input unit 6 at the preceding stage or the end unit 12, and transfers the safety input to the additional input unit 6 at the following stage. Thus, on the safety information line 42 with safety input and safety output as a common line, each of the safety control sections 45 and 46 selects a necessary signal and an unnecessary signal is transferred as it is, so that various signals can be mixed on the same line. Safety input and safety check information similar to those previously described with reference to FIG. 5 are also applied as the safety input and safety check information transferred on the safety information line 42 in FIG. 6, and further FSD output line 48 and synchronizing signal line 49 can also adopt the same configuration as that previously described with reference to FIG. 5.

In the described configuration, the non-safety information of each unit is transferred in order via the non-safety information line 52 and finally reaches the master unit 5. The master unit 5 receiving the non-safety information includes a non-safety information output section 56 for performing display and external output based on the non-safety information. The non-safety information output section 56 can use a monitor for externally displaying the non-safety information intact or after processing, an interface for externally outputting the non-safety information intact or after processing, and the like. For example, the safety state of each safety component is displayed on the monitor, occurrence of an error and ON/OFF of each external connected machine are displayed, the part where safety cannot be checked is blinked or displayed, and the information is sent to the machines such as PLC. In the example in FIG. 7, a non-safety information display section 57 for producing monitor display and a non-safety information interface 55 of external input/output terminals, etc., are included as the non-safety information output section 56. However, the non-safety information output section 56 is not limited to installation in the master unit 5 and instead or in addition, it can also be provided in a unit. As a plurality of non-safety information output sections are provided, it is also made possible to transfer non-safety information between the non-safety information output sections. To install the non-safety information output section in a unit, non-safety information can be used in the non-safety information output section of the unit, so that the bus for transmitting non-safety information to any other unit and the master unit can be made unnecessary.

Next, handling of non-safety information separated from safety information will be discussed with reference to FIG. 7. In the figure, the configuration with the safety information line 42 with safety input and safety output as a common line previously described with reference to FIG. 6 is adopted, and the connection portion of the master unit 5, the additional output unit 16, and the additional input unit 6 is shown. In the example, also in the master unit 5, the safety component 1 and the safety relay output section 58 are connected to the master unit safety control section 47. The master unit 5 functions as additional input unit 6 and additional output unit 16. However, either or both of the members may be omitted in the master unit, needless to say.

Figure 7:
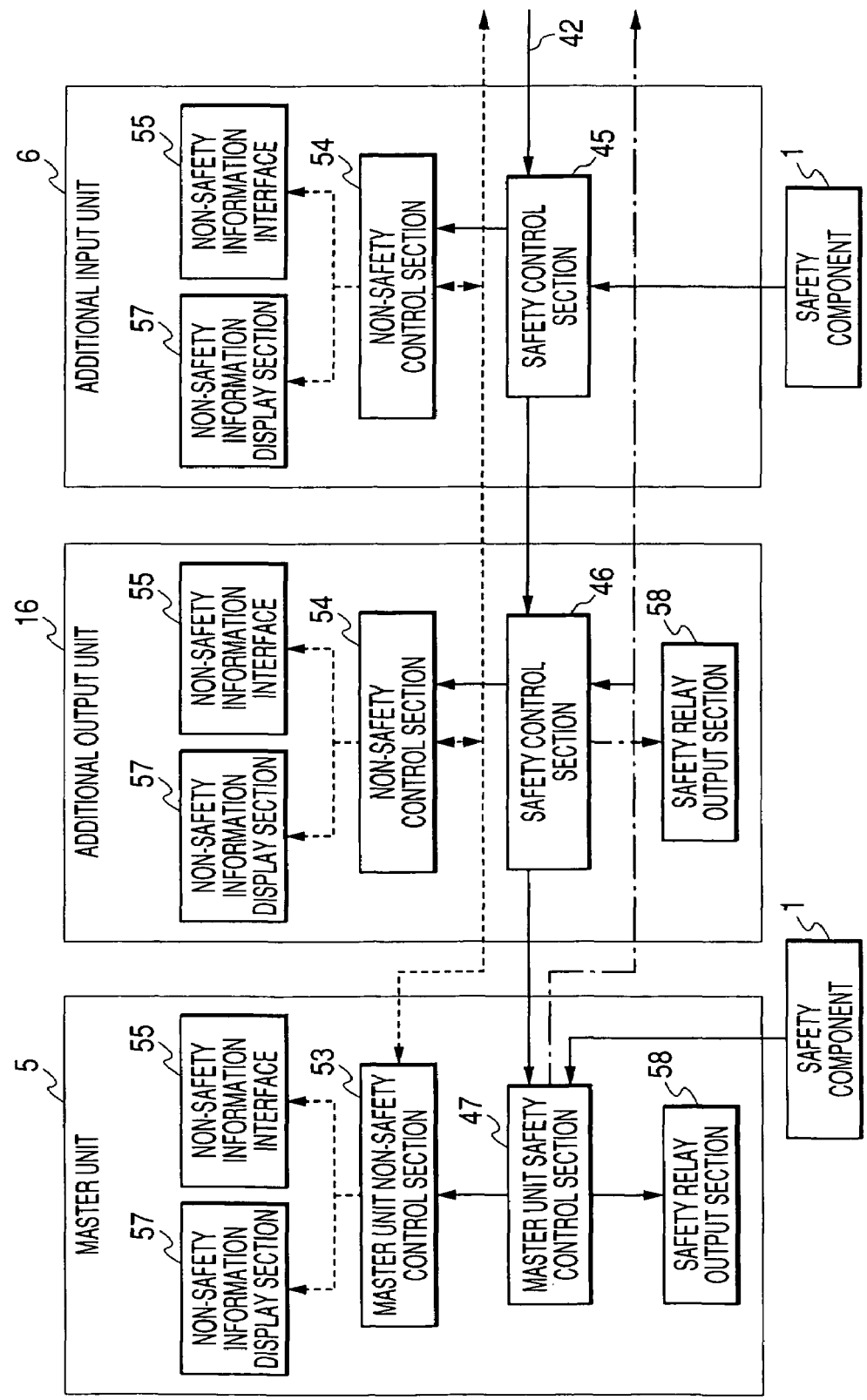
FIG. 7 is a block diagram to show flows of safety information and non-safety information in the safety relay system in FIG. 6.

Safety information is sent from the master unit safety control section 47 of the master unit 5 through the safety information line 42 indicated by the solid line arrow in FIG. 7 to the end unit (not shown in FIG. 7) on the through line (alternate long and short dashed line in FIG. 7). The safety information line 42 becomes the return line in opposite direction at the end unit for returning safety information from the end unit through the safety control section 45 of each unit to the master unit safety control section 47. At this time, safety input is acquired from the safety component connected to the safety control section 45 of the additional input unit 6. Each safety control section 45 generates new safety input based on safety input sent from the unit at the preceding stage and safety input of the safety component connected to the safety control section 45, and sends the generated safety input to the additional input unit 6 at the following stage. Thus, the safety input is sent in order from the master unit 5 through the safety control section 45 to the additional input unit 6 and finally is returned to the master unit safety control section 47. For example, as an AND operation is performed on all safety inputs together, if safety input cannot be obtained in any safety component, namely, if safety cannot be checked, safety output is not set to ON and the relay is opened for stopping the operation of a predetermined external connected machine.

On the other hand, the safety information line 42 also handles safety output and specifically the relay for controlling the operation of an external connected machine is opened/closed in the safety relay output section 58. The safety relay output section 58 opens/closes the relay directly or via a contactor, etc. Such a relay, contactor, etc., is contained in or connected to the safety relay output section 58. The master unit safety control section 47 of the master unit 5 outputs safety output based on safety input and sends safety output to the safety relay output section 58 to turn ON/OFF the operation of each external connected machine. In each additional output unit 16, the safety relay output section 58 is connected to the safety control section 46.

Figure 8:
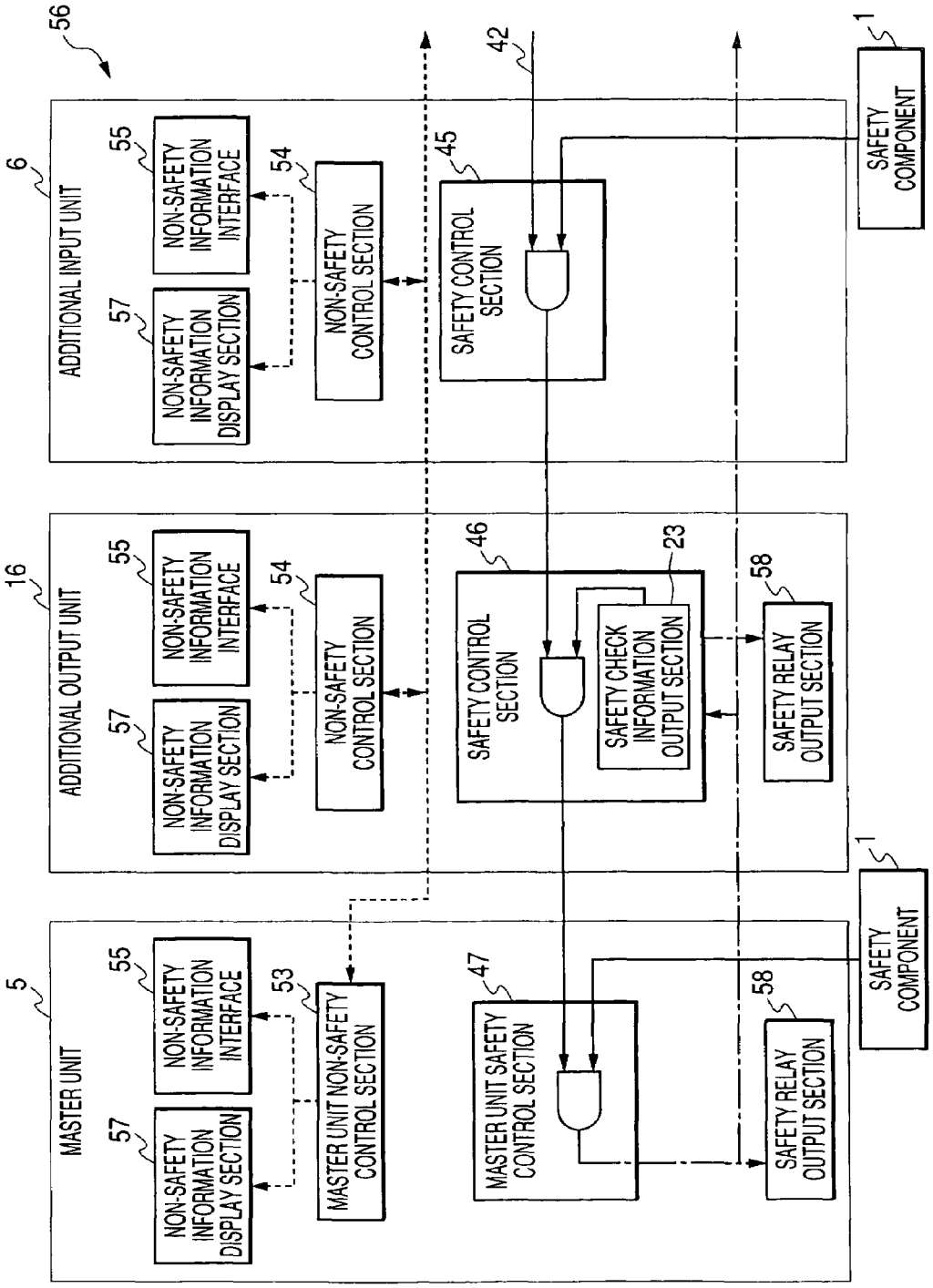
FIG. 8 is a block diagram to show an example wherein each safety control section is implemented as an AND circuit in the safety relay system in FIG. 7.
Figure 9:
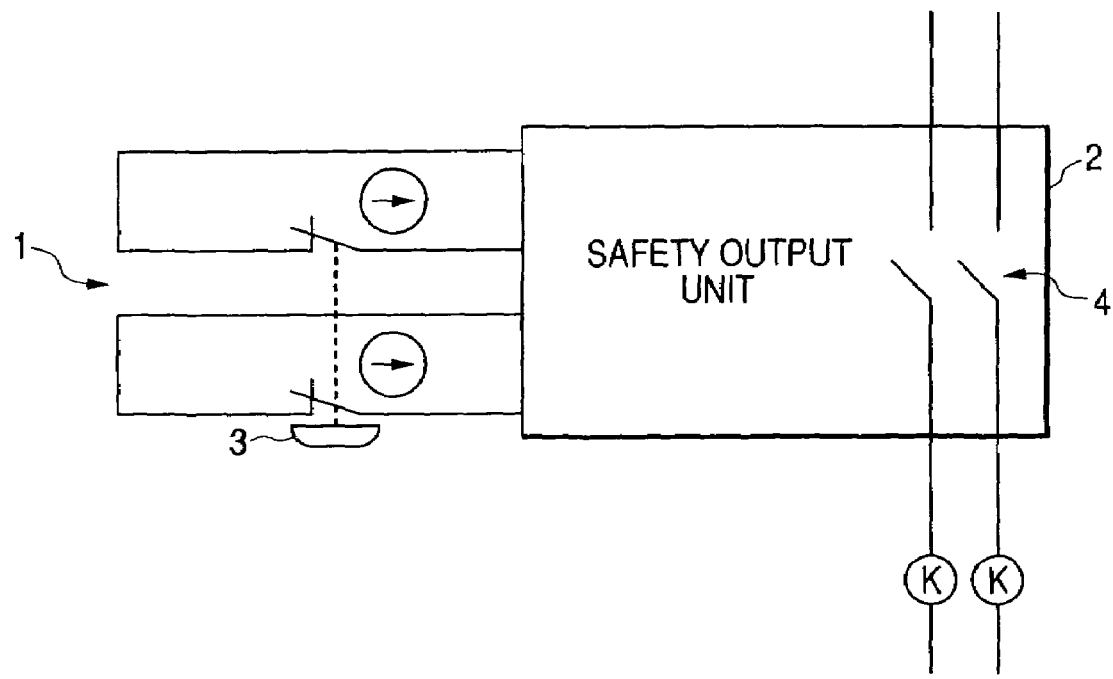
FIG. 9 is a schematic diagram to show an example of a safety relay system for opening and closing a relay with one safety component.

FIG. 8 shows a state in which the safety control section 45, 46 is implemented as an AND circuit as an example for implementing the configuration in FIG. 7. The safety control section 45, 46 shown in FIG. 8 performs AND operation for the signal sent from the unit at the preceding stage through the safety information line 42 and the signal of the unit containing the safety control section 45, 46 and sends the AND operation result to the following stage as new output. For example, the additional input unit 6 performs AND operation for output of the safety component 1 connected to the additional input unit 6 and output from the additional input unit at the preceding stage and sends the AND operation result to the following stage as new safety input. Accordingly, if safety cannot be checked in any one of the safety components 1 connected to the additional input unit 6, safety cannot be obtained and safety output is set to OFF for stopping the operation of the corresponding external connected machine. The additional output unit 16 performs AND operation for output of a safety check information output section 23 for checking the safety state of the additional output unit 16 and output of the additional output unit at the preceding stage by the safety control section 46, whereby if safety cannot be checked in any one of the additional output units, safety output is set to OFF for stopping the operation of the corresponding external connected machine. For example, the error signal of the additional output unit at the preceding stage and the error signal of the additional output unit are performed AND operation together and unless the normal operation can be checked in all additional output units 16, safety output cannot be obtained, so that safety can be secured.

The non-safety information consisting of more detailed information concerning the safety information is transferred separately from the safety information. In the example in FIG. 7, the non-safety information is transferred over the non-safety information line 52, a separate signal line from the safety information line 42. The non-safety information line 52 is installed from the master unit non-safety control section 53 of the master unit 5 to the end unit, and the non-safety control sections 54 of the additional input unit 6 and the additional output unit 16 are connected on the non-safety information line 52 so that they can communicate with each other. Each of the non-safety control sections 54 includes the non-safety information display section 57 and the non-safety information interface 55 as the non-safety information output section 56. The non-safety information display section 57 displays non-safety information to visually provide the user with detailed information concerning safety information. To display the information, text, an image, a moving picture, voice, and the like can be used in combination as required. Accordingly, when an event where safety cannot be checked occurs, the location and the cause of the event can be displayed for notifying the user of the event.

The non-safety information interface 55, which is I/O concerning non-safety information, can output non-safety information to an external machine, can obtain the necessary information and operation result from the external machine, can acquire processed and refined non-safety information and cause the non-safety information display section 57 to display the non-safety information, and can send the information to the non-safety control section 54 for sending data to another unit. In the example in FIG. 7, each of the master unit 5, the additional input unit 6, and the additional output unit 16 includes the non-safety information display section 57 and the non-safety information interface 55. However, a unit including only either of the non-safety information display section 57 and the non-safety information interface 55 and a unit including a different non-safety information output section may be mixed.

The non-safety control section 54 obtains safety information from the safety control section 45, 46, monitors the safety state, and causes the non-safety information display section 57 to display the safety information. However, the non-safety control section 54 does not send obtained information to the safety control section 45, 46. Accordingly, the safety information is not affected by the non-safety information. In other words, if a problem occurs in a circuit concerning non-safety information, the problem does not affect the safety circuitry and the reliability of the safety system is maintained. Thus, a circuit concerning non-safety information more detailed than simple safety information can be added to the safety relay system while the specifications required for the safety system are met, and moreover the added non-safety circuitry has no effect on the safety information and therefore need not satisfy the specification required for the safety circuit. Thus, comparatively flexible design is made possible and a safety system that can accomplish advanced information display, etc., can be realized. The added circuit is designed independently of the safety circuit, so that there is also the advantage that design change can be made comparatively easily.

[Rating Declaration]

A rating declaration part can be provided on a side of the end unit. For example, a machine receiving certification of CE marking, EMC service, etc., may be obliged to provide predetermined declaration of the mark of the certification authority, power consumption, etc. Generally, a method of putting a seal of rating declaration on the case of an apparatus, printing, marking, etc., is adopted. However, the standard requires that a declaration part of a predetermined size be provided in a portion of the outside of the apparatus that can be seen by the user, and miniaturization of the apparatus may be inhibited as the declaration space is reserved and depending on where the declaration space is located. Then, in the described safety relay system, a rating declaration part is provided on a side of the end unit, so that necessary declaration can be made using the space. Particularly, the end unit is always connected to the end face, so that an empty space can be provided on the opposite face of the end unit to the connection face although an intermediate connected unit has faces hidden as another unit is added. Then, declaration is made using the space, so that the necessary declaration can be provided without sacrificing the space of another unit. To join a plurality of units, the end unit fixed onto the end face forms a part of the apparatus and thus can provide a mode in which direct indication is made on the apparatus, and the declaration obligation can be fulfilled. This configuration eliminates the need for providing rating declaration on another unit, so that the rating declaration space of each unit can be decreased, contributing to miniaturization of the unit. If the function of the end unit is incorporated in the additional input unit or the additional output unit, the rating declaration part can also be provided on a side of the additional unit incorporating the end unit.

As described above, according to the safety relay system of the invention, information relevant to safety information, such as the state of each safety component, can be used as non-safety information and the safety information and the non-safety information are separated from each other, so that the circuit for handling the non-safety information can be prevented from affecting the safety information, and safety can be secured. Accordingly, a circuit concerning the non-safety information can be added to a safety circuit for easily performing maintenance work, etc. Since the safety circuitry and the non-safety circuitry are separated from each other, a complicated circuit configuration to secure safety is not required and the circuitry can be simplified and the non-safety circuit can be added to the safety circuit for rapidly and easily monitoring the system and recovering the system from trouble when trouble occurs.

What is claimed is:

1. A safety relay system for acquiring safety input indicating a safety state of a work area from one or more safety components, verifying the safety state based on (i) said safety input and (ii) an operation state of (a) said safety component or (b) at least one additional input unit, and if the safety state is verified, outputting safety output for opening/closing a safety relay to enable an external connected machine connected to the safety relay to operate and on the other hand, if it is determined that the safety state is not verified, opening/closing the safety relay to directly or indirectly stop the operation of at least a hazardous part in the external connected machine, said safety relay system comprising:

one or more additional input units each for verifying the safety state based on (i) the safety input from the safety component connected thereto, and (ii) the operation state of the (a) safety component or (b) the respective additional input unit, and generating new safety input, the new safety input indicating a safety state based on whether the safety state can be verified and sending new safety input as safety information, wherein said safety information is generated at least in part based on the new safety input;

a master unit for receiving the new safety input as the safety information from said additional input unit and providing safety output to operate the safety relay based on the new safety input;

a duplex safety information line for transferring safety information between said units;

a non-safety information line for transferring the information, which the additional input unit used to check the safety state, as non-safety information separate from the safety input that the master unit received, the non-safety information comprising information concerning the operation state of each safety component or each additional input unit, the non-safety information, line being separately provided from the safety information line, the non-safety information including at least any one or more of a. ON/OFF information of the safety component connected to the master unit or additional input unit, b. error state or error information of each unit, c. output information of the master unit or additional input unit, d. operation mode information of each additional input unit, e. setup information of each unit, and f. input state information in a state in which the safety input of the safety component is omitted; and a non-safety information output section for outputting the non-safety information transferred on said non-safety information line, wherein the one or more additional input units are configured to be connected to at least one other additional input unit, and when the other additional input unit is connected to the one or more additional input units, the one or more additional input units verifies the safety input generated by the connected other additional input unit and generates new safety input based on the safety input from the at least one other additional input unit and the safety input from the component connected to the one or more additional input units and the new safety input indicating a safety state based on whether the safety state of the connected other additional input unit can be verified.

2. The safety relay system as claimed in claim 1 wherein each additional input unit comprises a non-safety control section for communicating the non-safety information, and the non-safety information is transferred to each adjacent unit in order, whereby each additional input unit communicates with said master unit.

3. The safety relay system as claimed in claim 1 wherein each additional input unit comprises a non-safety control section for communicating the non-safety information, and each additional input unit communicates directly with said master unit.

4. The safety relay system as claimed in claim 1 further comprising:

an end unit being connected to one end of said one or more additional input units for causing said master unit to detect the number of the connected additional input units.

5. The safety relay system as claimed in claim 4 wherein said safety information line is parallel lines and wherein when safety input is transmitted from said master unit through said additional input units to the end unit and then is transmitted from the end unit to said master unit, each time the safety input passes through each of said additional input units, a shift is made on the parallel line to transmit the safety input, and the number of said connected additional input units can be detected based on which parallel line the safety input received at said master unit is detected from.

6. The safety relay system as claimed in claim 4 wherein a rating declaration part is provided on a side of the end unit.

7. The safety relay system as claimed in claim 1 further comprising:

one or more additional output units for receiving the safety output from said master unit and operating the safety relay based on the received safety output.

8. The safety relay system as claimed in claim 7 wherein said one or more additional input units and the one or more additional output units are connected to said safety information line for enabling said additional input units to communicate safety input to each other and the additional output units to communicate safety output to each other.

9. The safety relay system as claimed in claim 7 wherein said safety information line connects the one or more additional input units and the one or more additional output units on the same line for enabling the safety input and the safety output to be communicated between each unit and said master unit.

10. The safety relay system as claimed in claim 7 wherein at least either said additional input unit or the additional output unit comprises a non-safety information display section for externally displaying non-safety information and a non-safety information interface for sending non-safety information to an external machine.

11. The safety relay system as claimed in claim 7 wherein said safety information line is connected via a connector provided on each unit and either of the additional input unit and the additional output unit can be connected to the same connector.

12. The safety relay system as claimed in claim 11 wherein said safety information line comprises a safety input line and a safety output line and the safety input line is connected to said additional input unit for sending safety input and the safety output line is connected to said additional output unit for sending safety output.

13. The safety relay system as claimed in claim 1 wherein said safety information line is a serial line.

14. The safety relay system as claimed in claim 1 wherein each additional input unit comprises a safety control section for performing AND operation for safety input transmitted via said safety information line from the additional input unit connected to the preceding stage of that additional input unit and safety input from the safety component connected to that additional input unit and outputting the AND operation result as safety input.

15. The safety relay system as claimed in claim 1 further comprising:

a power unit being connected to said master unit for supplying power to said safety relay system.

16. The safety relay system as claimed in claim 1, wherein the one or more additional input units comprise a plurality of the additional input units, wherein each additional input unit verifies the safety state based on the safety input from the safety component connected to the safety input of preceding-stage additional input unit disposed at an opposite side of the master unit and the operation state of the safety component or the respective additional input unit, and sends new safety input as the safety information if the safety state is verified.

17. The safety relay system as claimed in claim 1, wherein each additional input unit comprises safe-inspection means for detecting the error state of the safety component connected thereto or the respective additional input unit, and the non-safety information comprises information specifying the safety component or unit which is in error state and its error content.

18. The safety relay system as claimed in claim 1, wherein the non-safety information comprises infonnation specifying the safety component or unit whose safety state cannot be verified.

19. The safety relay system as claimed in claim 1, wherein at least one safety component comprises a light curtain with a mute function, and the light curtain is monitored, and the non-safety information comprises information indicating entrance of light or interception of light, during the mute function.

* * * * *